United States Patent [19]
Bell, III

[11] Patent Number: 5,790,228
[45] Date of Patent: Aug. 4, 1998

[54] EYE WEAR FRAME AND ATTACHMENT SYSTEM

[76] Inventor: Thomas G. Bell, III, 4539 Wawona St., Los Angeles, Calif. 90065

[21] Appl. No.: 896,647

[22] Filed: Jul. 18, 1997

Related U.S. Application Data

[60] Provisional application No. 60/022,223 Jul. 19, 1996.
[51] Int. Cl.[6] .................... G02C 5/20; G02C 5/14
[52] U.S. Cl. ........................ 351/118; 351/41; 351/111
[58] Field of Search ........................ 351/118, 111, 351/41, 114, 119, 113, 158

[56] References Cited

U.S. PATENT DOCUMENTS 5,042,933 8/1991 Lear .............................. 351/111
5,302,977 4/1994 Markovitz et al. ............. 351/114

*Primary Examiner*—Hung X. Dang
*Attorney, Agent, or Firm*—Trask, Britt & Rossa

[57] ABSTRACT

Eye wear that is structured to give a customized fit to each individual wearer is disclosed. The eye wear comprises a lens-supporting frame, a surface engaging member and a retractable device interconnecting the lens-supporting frame to the surface engaging member. Various embodiments are disclosed, but one exemplary embodiment comprises a frame structured with the retractable device and a pair of ear pieces which are interconnected to the frame member by the retractable device. The eye wear are adjustable to the face and may readily be moved from the wearer's eyes to, for example, the wearer's forehead without having the lens-supporting frame slip.

20 Claims, 3 Drawing Sheets

5,790,228

EYE WEAR FRAME AND ATTACHMENT SYSTEM

This application claims the benefit of U.S. provisional application Ser. No. 022,223, filed Jul. 19, 1996.

BACKGROUND

1. Field of the Invention

This invention relates to eye wear and specifically to eyeglasses which are individually form fitting to the wearer and which are adjustable relative to an anchoring member.

2. Statement of the Art

It has been well-known through the history of making and wearing eyeglasses that eyeglasses are difficult to fit, are uncomfortable or are always slipping down the wearer's nose. Various changes in eyeglass designs have been implemented through the years to ameliorate these problems. For example, different sizes are provided in frame fronts and temples to accommodate the differences in face shapes and sizes. In addition, structural modifications have been made, such as providing earpieces which wrap partially around the ears to keep glasses in place or providing nose pads made of more pliant material to prevent the glasses from pressing into the nose of the wearer. Those features address some of the known problems of discomfort associated with the wearing of eyeglasses. Still, wearers of eyeglasses suffer from ill-fitting glasses and experience discomfort.

In addition, eyeglass wearers often want to remove their glasses momentarily from in front of their eyes. This may be because they see distances better without their glasses or, alternatively, they only need glasses for reading and otherwise want their glasses only for occasional use. But like sunglass wearers, the person often wants his or her glasses close at hand so that the glasses can be donned upon a moment's notice. Often, people hang their glasses by tethered support means around their neck, but the tethering means are often uncomfortable when the glasses are worn or supported about the ears. A more common practice is to position the glasses on the head above the forehead until needed again. However, glasses placed on the head often fall off.

Thus, it would be beneficial to provide eyewear designed to adapt to the head and face shape of the individual wearer to provide comfortable and individually adapted wear. It would also be beneficial to provide eyeglasses that, by their design, may be held securely in place on the head without slipping off.

SUMMARY OF THE INVENTION

In accordance with the present invention, an eye wear frame is structured to be adaptable to the shape and size of an individual's face and to the head of the wearer to thereby prevent the eye wear from falling down the nose or face of the wearer. The eye wear is, therefore, more comfortable to wear. The eye wear of the present invention is also adapted to be positionable away from the face in a manner which allows the eye wear to remain in place on the forehead, for example, without falling off.

The eye wear of the present invention generally comprises a lens-supporting frame, at least one surface engaging member for holding the lens-supporting frame against the face or head and a retractable device interconnected between the lens-supporting frame and the surface engaging member or members to provide an adjustable distance between the lens-supporting frame and the surface engaging member. The adjustability provided by the retractable device allows the lens-supporting frame to be snugly held against the head and allows the glasses to be adapted to the individual's face shape and size.

The lens-supporting frame generally comprises a frame member which extends across the brow at or above the supraorbital process. The frame member is adapted to support two lenses positioned along the frame member to correspond with the position of the eyes. The frame member may be of any style or design and may be a full frame (i.e., the frame extends about the periphery of the lenses) or a partial frame (i.e., extends only partially about, or in proximity to, the lenses). The frame member may be structurally inflexible, much like conventional eyeglass frames which are made from metal or inflexible plastic materials. Alternatively, and perhaps preferably, the frame member is flexible and adapts to the shape and size of the wearer's face when the lens-supporting frame is held against the wearer's face by action of the retractable device. The lens-supporting frame may be a conventional eyeglass frame structure which supports corrective lenses or tinted lenses (sunglasses) or the lens-supporting frame may be any other wearing apparel for the eyes such as safety glasses, ski goggles, swimming goggles or any other sports eye wear.

The lenses may be attached to the lens-supporting frame in any suitable manner. The lenses may be permanently secured to the lens-supporting frame, as is the case with conventional eye wear. Alternatively, the lenses may be attached to the frame member in a manner which permits the lenses to be readily detached from the frame member so that the lenses can be changed, for example, from untinted lenses to tinted (i.e., sunglass) lenses. Further, the lenses may be attached to the frame member in such a fashion that the lenses are angularly adjustable relative to the frame member. Although the lens-supporting frame may be adapted to hold or attach two lenses, the lens-supporting frame may be adapted to hold a single panoramic lens.

The surface engaging member of the present invention serves to anchor the lens-supporting frame to another surface to comfortably hold the frame member against the face of the wearer. In most embodiments of the invention, the surface engaging member may be ear pieces which engage the wearer's ears in a manner similar to the form and purpose of conventional glasses. As such, the ear pieces may be formed to fit around and behind the ear. Alternatively, the surface engaging member may be a band or strap which is positionable about the back of the head. Still alternatively, the surface engaging member may be some form of head gear, such as a hat or cap, or sports head gear, such as a bicycle or motorcycle helmet. The surface engaging member is structured to provide a point of attachment of the lens-supporting frame thereto via the retractable device of the present invention.

The retractable device provides a means for connecting the lens-supporting frame to the surface engaging means and provides adjustability of the lens-supporting frame relative to the surface engaging means so that the lens-supporting frame fits comfortably and snugly against the wearer's head. The retractable device may, in a preferred embodiment, comprise a spring-biased reel about which is wound a length of line. The spring-biased reel may be connected to the lens-supporting frame and the free end of the line may be secured to the surface engaging member or the spring-biased reel may be connected to the surface engaging member and the free end of the line may be secured to the lens-supporting frame. In either embodiment, the lens-supporting frame is rendered movable relative to the surface engaging member.

As such, the lens-supporting member is more readily adapted to fit the face of the wearer and the lens-supporting member may be readily moved from the face to the head, or elsewhere, for temporary removal from the eyes. The retractable device may be any other suitable device which provides an adjustable distancing of the lens-supporting frame from the surface engaging member, including elastic material which inherently returns to a given length after longitudinal stretching of the material.

The construction and benefits of the present invention over conventional glasses can be further appreciated in view of the detailed description of the various embodiments as described further below.

BRIEF DESCRIPTION OF THE DRAWINGS

In the drawings, which currently illustrate what is considered to be the best mode for carrying out the invention.

DETAILED DESCRIPTION OF THE ILLUSTRATED EMBODIMENTS

Figure 1:
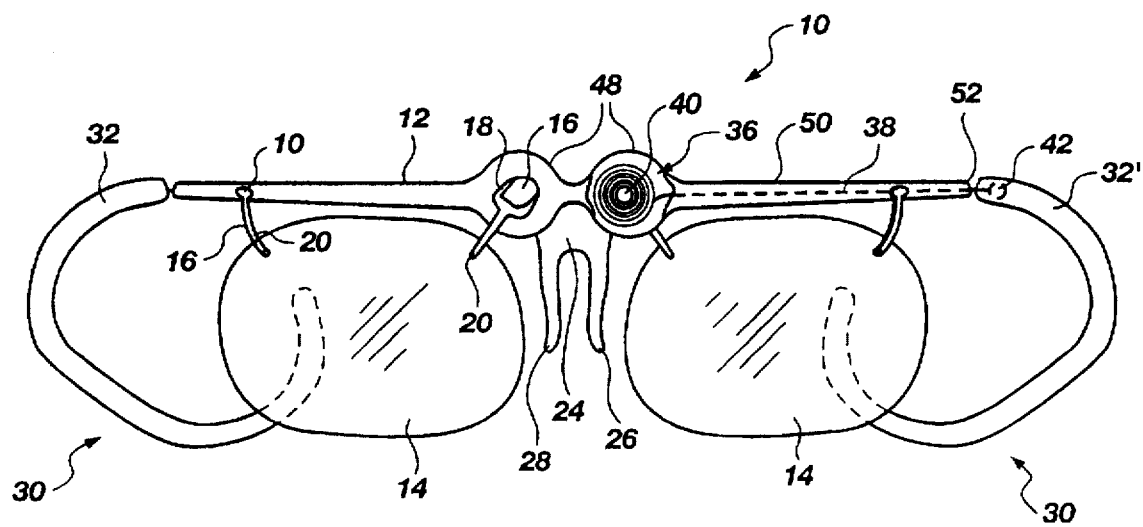
FIG. 1 is a front elevational view, in partial cutaway, of one embodiment of the eye wear frame with the retractable device located near the center of the frame.
Figure 2:
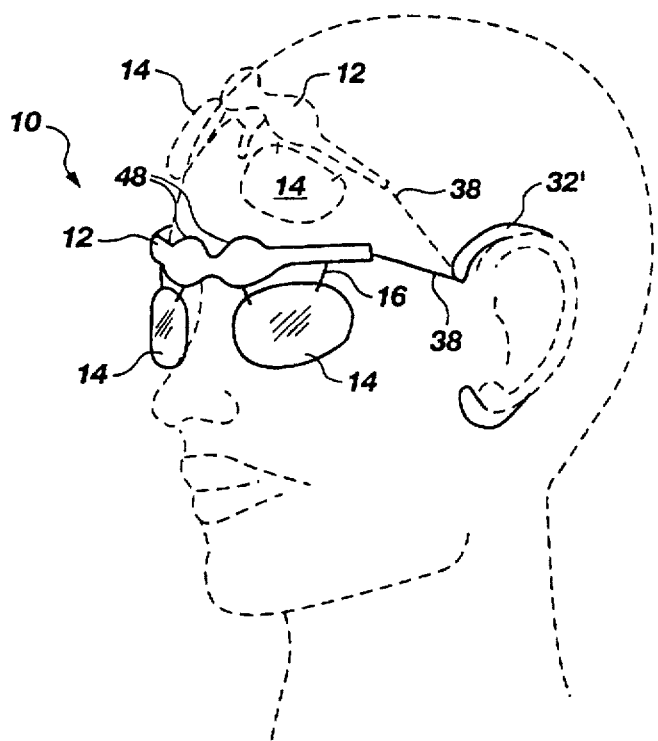
FIG. 2 is a perspective view of how the eye wear frame may be adjustable positioned in front of the eyes or above the forehead.

As shown in FIGS. 1 and 2, the eye wear 10 of the present invention generally comprises a frame member 12 which is positionable at or above the supraorbital foramen, corresponding generally to the eyebrow ridge. The frame member 10, although having the appearance in FIG. 1 of being linear (i.e., without curvature or contour) may be structured to curve along the eyebrow ridge of the face from the outer margin of one eye to the outer margin of the other eye, as illustrated in FIG. 2. The frame member 12 may be formed of hardened and substantially inflexible material, such as some metals and hardened plastics. Preferably, the frame member 12 is formed of a more compliant or flexible material which allows the frame member 12 to flex or curve to a small degree about the wearer's face responsive to the individual topography of the wearer's face.

The frame member 12 is structured to retain one or more lenses 14, two lenses being shown in FIGS. 1 and 2. The frame member 12 may be configured as conventional eyeglasses where the frame surrounds the lenses or the frame member 12 may, as shown in FIGS. 1 and 2, be a partial frame which only contacts a portion of the lenses 14. In one embodiment illustrated in FIG. 1, the lenses 14 may be attached to the frame member 12 by magnetic arms 16 which comprise a magnetized section 18 which removably attaches to the frame member 12 and an attachment arm 20 which is interconnected between the lenses 14 and the frame member 12. The use of detachable lenses 14 as illustrated in FIG. 1 allows the lenses 14 to be quickly and readily changed between, for example, non-tinted and tinted lenses or sunglasses. Additionally, the lenses 14 are supported by and extend downwardly from the frame member 12 and do not interfere with the contour of the eyes, cheeks, nose or other areas of the face. Thus, the individual lenses 14 may be adjusted relative to the frame member 12 in any manner suitable to the need or fancy of the wearer. The attachment arm 20 of the lenses 14 may even be structured with an articulating section which enables the lens to be lifted away from the eyes and to be positioned at an angle to the head.

The frame member 12 may include a nose piece section 24 having a left nose pad 26 and a right nose pad 28 to engage either side of the wearer's nose. The nose piece section 24 may be separately attached to the frame member 12 in a manner which temporarily attached or permanently attached to the frame member 12. Alternatively, the nose piece section 24 may be integrally formed with the frame member 12. The nose piece section 24 may be beneficial to the wearing of the eye wear 10, but a nose piece section 24 is not required in the formation of the eye wear 10.

The frame member 12 is positioned on or about the face of the wearer by use of a surface engaging member which principally serves to anchor the frame member 12 to another surface on the wearer's head, face or on a piece of head wear, as described more fully hereinafter. As illustrated in FIGS. 1 and 2, the surface engaging member 30 is a pair of ear pieces 32 which are preferably molded to specifically fit the contour and shape of the wearer's ear at the mastoid process. The ear pieces 32 may, for example, be made of a thermoplastic "memory" material which, when heated, is moldable to the unique contour of the wearer's head and ear. The ear piece 32 preferably wraps about the ear, extending from the top portion of the ear to below the ear lobe, as shown in FIG. 2.

The frame member 12 of the eye wear 10 and the surface engaging member 30, or ear pieces 32, are interconnected by a retractable device 36 which includes a line 38 which extends from the frame member 12 to the surface engaging member 30. The retractable device 36 may be any suitable device which provides a degree of adjustable distancing between the frame member 12 and the surface engaging member 30. That is, the retractable device 36 allows the frame member 12 to be extended away from the surface engaging member 30 so that the frame member 12 can be repositioned away from the eyes, such as to the forehead, as illustrated in FIG. 2. The retractable device 36 is also structured to provide a snug fit of the frame member 12 against the wearer's face. Thus, the retractable device 36 is any suitable structure or material which has a degree of elasticity or linear movement in two directions.

In a preferred embodiment, the retractable device 36 may be a spring-biased spool 40 about which line 38 is wound. As shown in FIG. 1, a free end 42 of the line 38 may be secured to the surface engaging member 30, or ear piece 32. Therefore, with the ear pieces 32 securely positioned about the ears, as shown in FIG. 2, the frame member 12 can be pulled away from the ear pieces 32 a distance to position the frame member 12 against the wearer's face. When the wearer wishes to reposition the eye wear 10 away from his face, the frame member 12 can be grasped and pulled outwardly from the surface engaging member 30. The line 38 will be fed out from the spool 40 allowing the frame member 12 to be repositioned. The eye wear 10 may, for example, be positioned on the head or forehead, as suggested in phantom line in FIG. 2, above the eyes. The eyewear 10 will remain positioned in place without slipping off the head or forehead. Likewise, when the ear pieces 32 are removed from about the ears, the retractable device 36 will draw the line 38 back into the spring-biased spool 40 and the ear pieces 32 will snap into adjacent positioning beside the frame member 12, as shown in FIG. 1. Other suitable retractable devices may include linearly elastic material secured to the frame member 12 and to the surface engaging member 30 which stretches lengthwise to allow repositioning of the frame member 12 and then flexes back into place when the frame member 12 is suitably positioned.

The placement or location of the retractable device 36 may vary. For example, a shown in FIGS. 1 and 2, the frame member 12 may be configured at a central point with two slightly enlarged casements 48 which are hollow inside. The casements are sized to receive the spring-loaded spool 40 of a retractable device 36. The frame member 12 is also structured with a hollow channel 50 extending from the casement 48 to the end 52 of the frame member 12. The line 38 extends from the spool 40, through the hollows channel 50 and out a hole formed at the end of the frame member 12. The line 38 is then secured to the surface engaging member 30 or, as shown, the ear piece 32. A spring-biased spool 40 is located in each of the two casements 48—one which extends a line 38 through the right side of the frame member 12 to a right ear piece 32 and another which extends a line 38 through the left side of the frame member 12 to a left ear piece 32'.

Figure 3:
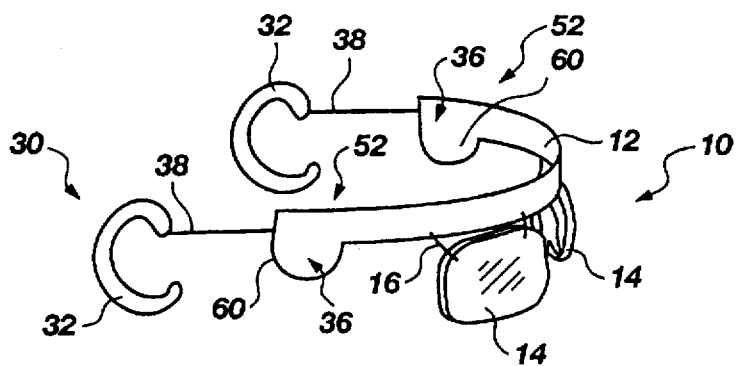
FIG. 3 is perspective view of an alternative embodiment of the present invention where the retractable device is located at the opposing ends of the frame.

In an alternative embodiment shown in FIG. 3, the retractable device 36 may be positioned at the outer ends 52 of the frame member 12 in an area roughly corresponding to the temples of the wearer. As illustrated, casements 60 may be formed at the outer ends 52 of the frame member 12 which are sized to receive the spring-biased spool or similar mechanism of a retractable device 36. The line 38 extends outwardly from each casement 60 through a hole formed in the end 52 of the frame member 12, and the free end 42 of the line 38 is secured to the surface engaging members 30, or ear pieces 32. In this embodiment, the frame member 12 need not be formed with any hollow portions except for the casements 60.

Figure 4:
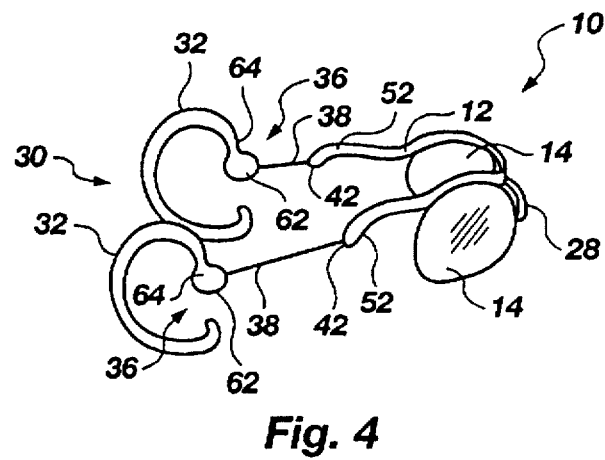
FIG. 4 is a perspective view of another alternative embodiment of the invention where the retractable device is connected to eye pieces which engage about the wearer's ears.
Figure 5:
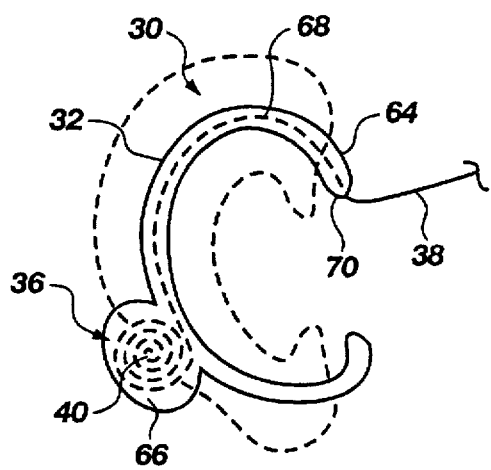
FIG. 5 is an enlarged view of an ear piece illustrating an alternative location for the retractable device thereon.

In yet another alternative embodiment shown in FIG. 4, the retractable device 36 may be located in the surface engaging member 30 or, as shown, the ear pieces 32. An enlarged casement 62 may be formed at the upper end 64 of each ear piece 32 with the casements 62 being sized and configured to receive a spring-biased spool of line 38 or a similar mechanism of the retractable device 36. The free end 42 of the line 38 extends outwardly from the ear pieces 32 and is secured to the ends 52 of the frame member 12. The retractable device 36 may be positioned on the ear pieces 32, but, as shown in FIG. 5, the retractable device 36 may be located anywhere along the ear piece 32. As shown in FIG. 5, the retractable device 36 may be located so that it will be hidden behind the wearer's ear. As such, the ear piece 32 is formed with an enlarged casement 66 sized to accommodate the spring-biased spool 40, or other suitable mechanism, of the retractable device 36, and is further formed with a hollow channel 68 through which the line 38 extends to exit out a hole 70 formed in the upper end 64 of the ear piece 32.

Figure 6:
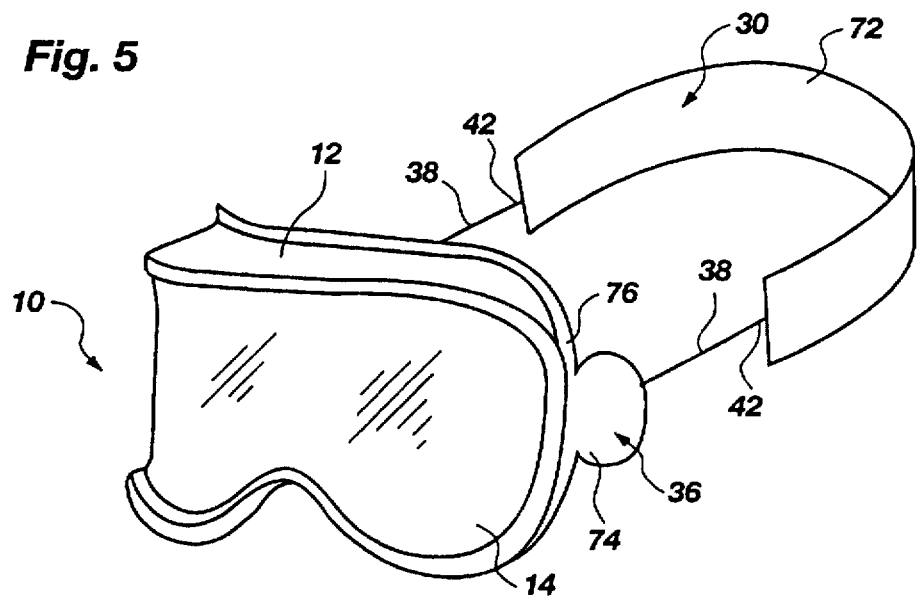
FIG. 6 is a perspective view of an alternative embodiment of the eye wear frame where the frame is structured as ski or swim goggles.

The eye wear 10 of the present invention may be adapted for use as corrective eyeglasses with prescription lenses, as sunglasses, ski goggles, swim goggles, safety glasses or any type of protective eye wear for sports or other activities. The eye wear 10 of the present invention may even be adapted for use as an attachable item to some head covering, such as a helmet or cap. As shown in FIG. 6, for example, the frame member 12 of the eye wear 10 may be formed as a type of goggle, such as for skiing or swimming, which is configured to encircle a single lens 14. The frame member 12 may typically be configured to contact the wearer's face at all points about the periphery of the frame member 12 to produce an air-tight and/or water-tight seal. In the present invention, the frame member 12 is connected to a surface engaging member 30 which may take any suitable form for attaching to the wearer's head, such as a band 72 sized to extend about the back of the user's head. A casement 74 may be formed at any suitable place along the frame member 12, such as at the outer ends 76 thereof, to enclose the spring-biased spool or other suitable mechanism of a retractable device 36. The free end 42 of the line 38 extends out from the casement 74 to the surface engaging member 30, or band 72, where is may be fixedly or detachably secured. Alternatively, as suggested earlier, the spring-biased spool or other suitable mechanism of the retractable device 36 may be connected to the surface engaging member 30, or band 72, and the free end 42 of the line 38 may be fixedly or detachably secured to the frame member 12 in any suitable manner. As structured, the frame member 12 is held snugly against the wearer's face during use, and is capable of being repositioned from in front of the wearer's eyes to another portion of the head (e.g., the forehead) while not in use and the frame member 12 will not slip down from the head.

Figure 7:
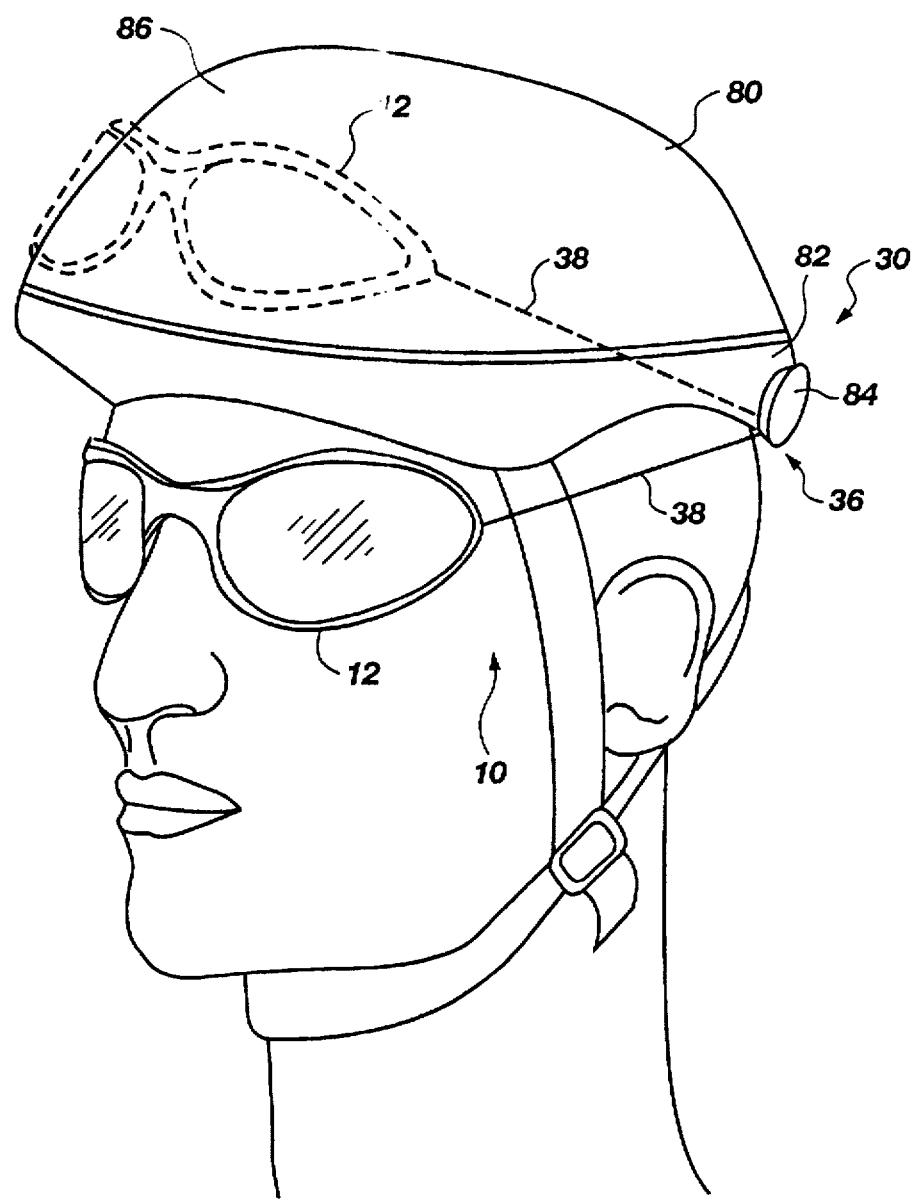
FIG. 7 is a perspective view of another alternative embodiment of the eye wear frame where the frame is structured for use and attachment to a helmet or similar head gear.

FIG. 7 illustrates yet another embodiment of the eye wear 10 where the surface engaging member 30 is some type of head gear, here shown as a conventionally configured bicycle helmet 80. The frame member 12 of the eye wear 10 may be formed as a conventional pair of sunglasses or any other suitable type or configuration of eye wear. The retractable device 36 may, most suitably, be attached to the rim 82 of the helmet 80. For example, a spring-biased spool housing 84 may be securely attached to the rim 82 of the helmet 80 and the line 38 may extend outwardly therefrom to attach, in either a fixed or detachable manner, to the frame member 12 of the eye wear 10. As previously described, the frame member 12 may be pulled away from the wearer's face and repositioned on the top front 86 of the helmet 80 during times when the wearer does not wish to wear the eye wear over his eyes. The retractable device 36 keeps the eye wear 10 in place on the helmet 90 without falling off.

The eye wear of the present invention has certain advantages over conventional eye glasses. The eye wear of the present invention is generally of lighter weight, is more compact and is reduced in size over conventional eyeglasses. The eye wear of the invention stay on the head better due to the retractable device which keeps it in place on the face. As a result, the eye wear of the present invention is more suitable for use in sports and other activities. The eyeglasses can be easily shifted from the eye area to the upper portion of the forehead and the eye wear will stay snugly in place on the wearer's head. With minor modifications, the eye wear can be adapted for attachment to headgear, such as a football helmet, motorcycle helmet, cap, ski cap, or the like. The lack of conventional temples makes the eye wear ideal for such uses. The eye wear can be adapted to many different uses. Thus, reference herein to specific details of the illustrated embodiments is merely by way of example and not by way of limitation. It will be apparent to those skilled in the art that many modifications of the basic illustrated embodiment may be made without departing from the spirit and scope of the invention as recited by the claims.

What is claimed is:

1. Eye wear comprising:
   a lens-supporting frame structure;
   at least one surface engaging member adjustably interconnected to said lens-supporting frame structure; and
   a retractable device connected to said lens-supporting frame structure and said at least one surface engaging member to provide adjustable distancing between said lens-supporting frame structure and said at least one surface engaging member.

2. The eye wear of claim 1 wherein said retractable device further comprises a retractable line extending between said lens-supporting frame structure and said at least one surface engaging member.

3. The eye wear of claim 2 wherein said retractable device further comprises a spring-biased spool about which said retractable line is wound leaving a free end of said retractable line for attachment away from said spring-biased spool.

4. The eye wear of claim 3 wherein said spring-biased spool is attached to said lens-supporting frame structure and said free end of said line is secured to said at least one surface engaging member.

5. The eye wear of claim 4 wherein said lens-supporting frame structure is a frame member configured to retain at least one lens and said at least one surface engaging member is a pair of ear pieces configured to substantially encircle the ears of a wearer.

6. The eye wear of claim 4 wherein said lens-supporting frame structure is a frame member configured to retain a single lens sized to extend across both eyes of a wearer.

7. The eye wear of claim 3 wherein said spring-biased spool is attached to said at least one surface engaging member and said free end of said line is attached to said lens-supporting frame structure.

8. The eye wear of claim 7 wherein said at least one surface engaging member is a pair of ear pieces configured to substantially encircle the ears of a wearer and said lens-supporting frame structure is a frame member configured to retain at least one lens.

9. The eye wear of claim 7 wherein said at least one surface engaging member is protective head gear and said lens-supporting frame structure is a frame member configured to retain at least one lens.

10. The eye wear of claim 9 where said protective head hear is a helmet.

11. Eye wear comprising:
    a frame member for retaining at least one lens;
    at least one surface engaging member joined to said frame member such that said frame member is movable away from said at least one surface engaging member; and
    a retractable device for interconnecting said frame member to said at least one surface engaging member to provide said adjustable movement between said frame member and said at least one surface engaging member.

12. The eye wear of claim 11 wherein said frame member is flexible.

13. The eye wear of claim 12 wherein said frame member is configured to retain two lenses in proximity thereto.

14. The eye wear of claim 12 wherein said frame member is configured as a partial frame to extend across the brow of the wearer.

15. The eye wear of claim 14 wherein said frame member further includes magnetized surfaces for receiving a reciprocatingly magnetized portion connected to said lenses to effect detachable attachment of said lenses to said frame member.

16. The eye wear of claim 14 wherein said frame member is a full frame configured to extend about the periphery of said lenses.

17. The eye wear of claim 11 wherein said retractable device comprises an linearly elastic line which extends between said frame member and said surface engaging member.

18. The eye wear of claim 11 wherein said retractable device comprises a spool of retractably wound line, said line extending between said frame member and said at least one surface engaging member.

19. The eye wear of claim 18 wherein said spool is attached to said frame member and said line is attached to said at least one surface engaging member.

20. The eye wear of claim 18 wherein said spool is attached to said at least one surface engaging member and said line is attached to said frame member.

* * * * *

UNITED STATES PATENT AND TRADEMARK OFFICE
CERTIFICATE OF CORRECTION

PATENT NO. : 5,790,228
DATED : August 4, 1998
INVENTOR(S) : Bell III

It is certified that error appears in the above-identified patent and that said Letters Patent is hereby corrected as shown below:

On the cover page, in the "Abstract," line 9, change "are" to --is--;
In Column 3, line 23, change "adjustable" to --adjustably--;
In Column 3, line 25, after "is" insert --a--;
In Column 3, line 39, after "use" insert --with--;
In Column 4, line 20, after "manner" insert --in-- and after "which" insert --it is--;
In Column 4, line 32, after "which" change "are" to --is--;
In Column 4, line 67, insert a comma after "40";
In Column 5, line 16, after "example," change "a" to --as--;
In Column 5, line 22, before "end" insert --outer--;
In Column 5, line 23, change "hollows" to --hollow--;
In Column 5, line 40, before "end" (first occurrence) insert --outer--;
In Column 5, line 53, before "ends" insert --outer--;
In Column 6, line 18, after "where" change "is" to --it--;
In Column 6, line 45, change "90" to --80--;
In Column 6, line 50, change "stay" to --stays--; and
In Column 7, line 18, insert a comma after "wound";
In Column 8, line 1, change "where" to --wherein--
In Column 8, line 2, change "hear" to --gear--;
In Column 8, line 22, delete "said" and insert --a pair of--;
In Column 8, line 26, change "14" to --13--;
In Column 8, line 29, change "an linearly" to --a linear--; and
In Column 8, line 30, after "and said" insert --at least one--.

Signed and Sealed this

Twenty-fifth Day of May, 1999

Attest:

Q. TODD DICKINSON

*Attesting Officer*   *Acting Commissioner of Patents and Trademarks*